Nov. 3, 1970
H. A. GRIFFIN
3,537,757
DUAL POLARITY VOLTAGE DISCRIMINATOR
Filed April 29, 1968
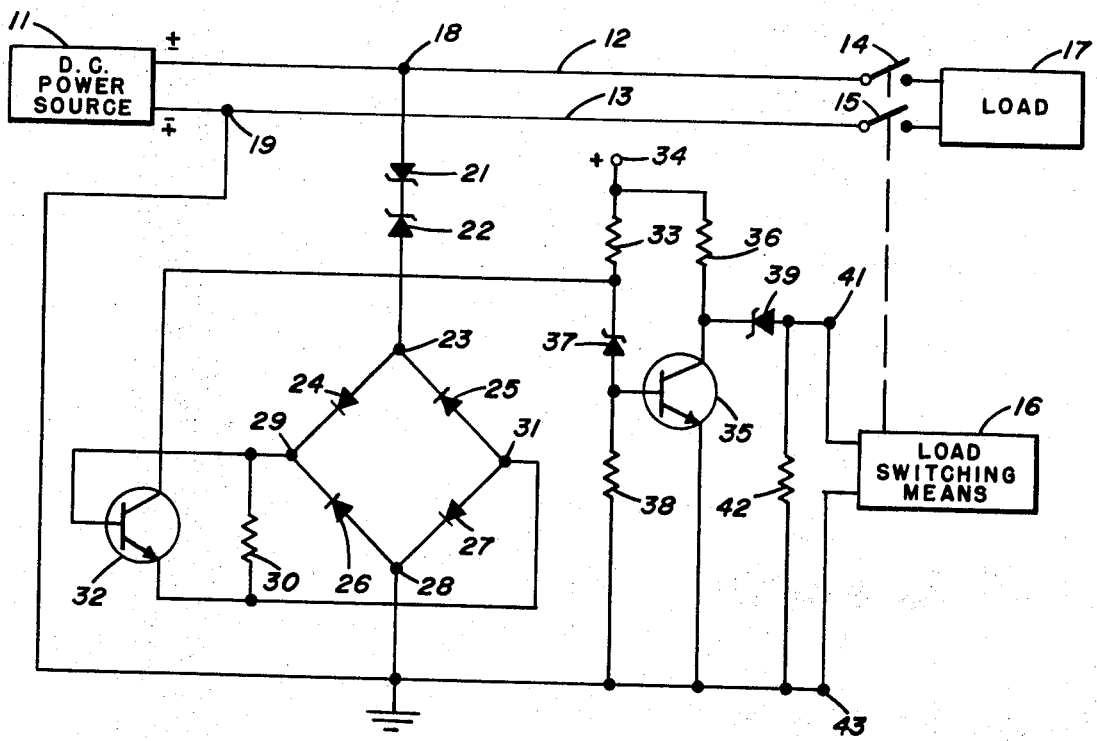
INVENTOR
HUGH A. GRIFFIN
BY H. H. Loscke ATTORNEY

United States Patent Office 3,537,757
Patented Nov. 3, 1970

---

3,537,757
DUAL POLARITY VOLTAGE DISCRIMINATOR
Hugh A. Griffin, Fortville, Ind., assignor to the United States of America as represented by the Secretary of the Navy
Filed Apr. 29, 1968, Ser. No. 724,939
Int. Cl. H03k 5/20
U.S. Cl. 307—235                                    1 Claim

ABSTRACT OF THE DISCLOSURE

A voltage discriminating control circuit for automatically detecting and monitoring the presence or absence of a direct current voltage in excess of a predetermined magnitude, of either positive or negative polarity, comprised of a pair of Zener diodes placed back to back, for sensing the relative magnitude of the voltage to be monitored, coupled in series with a diode bridge across that voltage. The bridge converts the monitored voltage, when in excess of a predetermined minimum absolute level, regardless of polarity, to a single polarity potential for controlling a solid state transistor-Zener diode switching network which may actuate any suitable load switching means to maintain a load coupled to a direct current voltage source whose output potential is proportional to the monitored voltage, only so long as the potential level of the monitored voltage remains in excess of the absolute predetermined magnitude.

BACKGROUND OF THE INVENTION

This invention is in the field of electrical voltage level sensing and protection systems, and more specifically in the area of voltage discriminating control circuitry for monitoring an applied voltage of either positive or negative polarity.

The complex weapons systems utilized by military forces of today often require remote electronic arming control systems in order that the weapons may remain "unarmed," and therefore considerably less dangerous, until immediately prior to launching. In the development of such electronic arming control systems a need has arisen for an electrical voltage level sensing and protection means for sensing a voltage proportional to the direct current voltage level of the power source which supplies the energy to the arming control system, to determine whether its potential level exceeds a necessary predetermined absolute value indicating proper functioning of the arming control system circuitry, or whether the potential level is below the predetermined absolute value indicating the possibility of a malfunction in the direct current arming power source or short circuits within the load which includes the various cables leading to the weapons to be armed. A suitable sensing and protection means should maintain the D.C. arming power source coupled to the arming control system so long as the monitored potential level, which is proportional to the output potential of the arming power source, exceeds an absolute predetermined magnitude, and to protect the arming control system and weapons to be armed by uncoupling the power source from the arming control system whenever the monitored potential level drops below the necessary absolute predetermined magnitude. The present invention fulfills this need.

Relative voltage level indicating means of the prior art have included neon lamps, and single Zener diodes in association with indicator lamps. These devices merely indicate the presence or absence of a predetermined voltage level and do not provide automatic protection for the associated circuitry. Also, the voltage required to illuminate a neon lamp presents a hazard in airborne arming control systems by tending to cause dielectric breakdown in the system cabling when operated at elevated altitudes.

SUMMARY OF THE INVENTION

The present invention provides a dual polarity voltage discriminating control circuit for monitoring a voltage proportional to the output potential of a direct current power source to detect the presence or absence of an absolute voltage level in excess of a predetermined magnitude. The invention controls any suitable load switching means to maintain the power source coupled to the load so long as its absolute voltage level exceeds the desired predetermined magnitude, and to uncouple the power source from the load whenever this absolute voltage level drops below that predetermined magnitude. The invention is believed to have relatively wide utility as a voltage level sensing and protection means, and has proven useful as a protection circuit in military airborne weapons arming control systems.

The invention is comprised of a pair of Zener diodes placed back to back, in series with a diode bridge for coupling across the potential to be monitored, which may be the direct current arming potential source itself, or a separate control potential proportional to the output of the potential source. The Zener diodes are chosen so that their avalanche, or breakdown, levels are equal to, or proportional to, the predetermined minimum acceptable magnitude of the voltage from the monitored D.C. potential source. The diode bridge serves to convert any potential which is in excess of the predetermined magnitude, regardless of polarity, into a single polarity signal for use as a control potential for controlling a transistor-Zener diode network which, in turn, controls the operation of a suitable load switching means for coupling the monitored D.C. potential source to the protected load only so long as the source potential remains above the desired predetermined magnitude.

BRIEF DESCRIPTION OF THE DRAWING

The objects and the attendant advantages, features, and uses of the invention will become apparent from the following detailed description when considered in conjunction with the accompanying drawing wherein there is shown a schematic diagram of one embodiment of the dual polarity voltage discriminating control circuit comprising the invention in which the invention is utilized to monitor directly the output potential of a D.C. power source. It is to be understood that in other embodiments, for various applications, the invention might be utilized to monitor a control potential proportional to the output potential of the D.C. power source, rather than the direct output of the source itself.

DESCRIPTION OF THE PREFERRED EMBODIMENT

Referring more particularly to the embodiment of the invention shown in the figure of drawing block 11 represents a D.C. power source to be monitored, with polarity markings to indicate that source 11 may be of either polarity. The potential from source 11 is coupled via conductors 12 and 13, and contacts 14 and 15 of a suitable load switching means 16 to a load 17. Load switching means 16 may be comprised of a suitable manually resettable relay, i.e., one which must be manually set prior to each electrical actuation, or a time delay relay which requires an adjustable delay time after being energized before its contacts are actuated. Suitable load switching means of this type prevent the load switching means from immediately recoupling source 11 to load 17, in case of a short circuit in the load. Input terminals 18 and 19 of the dual polarity voltage discriminating circuit comprising the invention are coupled across source 11 via conductors 12 and 13 respectively. A pair of back-to-back Zener diodes 21 and 22 having breakdown levels equal to the predetermined minimum acceptable magnitude of the voltage from source 11 are coupled in series between input terminal 18 and junction 23 of a polarizing bridge comprised of diodes 24, 25, 26, and 27. A terminal 28 of the bridge is coupled to input terminal 19. Terminals 29 and 31 of the bridge are coupled to the base and emitter electrodes respectively, of a control transistor 32 which has its collector electrode coupled via a resistance 33 to a source of positive direct current potential 34. A resistance 30 is coupled across the output terminals 29 and 31. A second control transistor 35 has its collector electrode coupled via a resistance 36 to source 34, its base electrode coupled via a Zener diode 37 to the junction of resistance 33 with the collector electrode of transistor 32 and via a resistance 38 to common terminal point 19, and its emitter electrode coupled to grounded common terminal 19. The collector electrode of transistor 35 is also coupled via a Zener diode 39 to a terminal 41 of load switching means 16, and via a resistance 42 to terminal 19. A terminal 43 of load switching means 16 is coupled to common terminal 19. The breakdown levels of Zener diodes 37 and 39 are chosen such that the potential of source 34 will break down diode 37 unless transistor 32 conducts, and will break down diode 39 unless transistor 35 conducts.

For convenience in specifically describing one operative example of the invention, the following table lists the various elements and components shown in the figure of drawing, with suitable values and types therefor. While this example of a working embodiment is provided herein, it is to be understood that these elements, components, and values are in now way to limit the invention thereto, as other values and other components of a like nature may be utilized to accomplish similar results.

TABLE

Zener diodes:
    21 and 22—1N970B
    37 and 39—1N757A
Transistors 32 and 35—2N2102
Diodes 24, 25, 26, and 27—1N483B
Resistances:
    30 and 36—4,700 ohms
    33—51,000 ohms
    38—10,000 ohms
    42—3,000 ohms
Load switching means 16—Suitable relay (having manual reset button or adjustable time delay, if desired)
D.C. power sources:
    11—32 volts
    34—28 volts

OPERATION

The operation of the invention occurs in the following manner. With reference to the figure of drawing, it will be assumed that, initially, power source 11 is turned off and that no potential difference exists between its output terminals. Under these conditions transistor 32 will be nonconducting and Zener diode 37 will be broken down by the positive potential from source 34 via resistance 33, thereby allowing a positive potential to be applied to the base electrode of transistor 35, causing it to conduct via resistance 36. So long as transistor 35 conducts, Zener diode 39 will not be broken down and load switching means 16 will maintain contacts 14 and 15 in their normally open condition, preventing source 11 from being coupled to load 17. The conduction of transistor 35 will continue until the monitored source 11 is activated and its output potential on conductors 12 and 13 exceeds the minimum acceptable absolute voltage level, which is also the breakdown level of Zener diodes 21 and 22.

Upon activation of power source 11, assuming it to be functioning properly to produce on conductors 12 and 13 an output potential in excess of the minimum acceptable absolute voltage level, its potential will be readily coupled through the forward biased one of the back-to-back Zener diodes 21 and 22 while the reverse-biased diode will be broken down, allowing the potential from source 11 to be applied across terminals 23 and 28 of the diode bridge. As will be noted by reference to the figure of drawing, regardless of the relative polarity of the potential produced on conductors 12 and 13 applied across bridge terminals 23 and 28 by direct current power source 11, the potential at bridge terminal 29 will remain positive with respect to terminal 31. Thus it may be seen that the diode bridge converts the applied direct current signal from source 11, regardless of polarity, into a fixed polarity signal for controlling switch transistor 32. The positive potential present at terminal 29 is coupled to the base electrode, and the negative terminal 31 is coupled to the emitter electrode, of switch transistor 32, causing it to conduct or be "switched on" so long as the potential from source 11 exceeds the minimum acceptable absolute voltage level. When transistor 32 conducts, it causes a drop in potential at its collector electrode and at the cathode electrode of Zener diode 37, causing diode 37 to cease conduction in the reverse direction thereby removing the positive potential at the base electrode of switch transistor 35 causing it to cease conduction. When transistor 35 ceases to conduct, the potential at its collector electrode and at the cathode electrode of Zener diode 39 will rise and exceed the breakdown voltage of diode 39, allowing a current to flow from source 34, via resistance 36 and diode 39, through load switching means 16 to ground potential. This current flow energizes load switching means 16, causing it to couple power source 11 across load 17 via contacts 14 and 15.

The invention will continue to maintain source 11 coupled to load 17 so long as the potential between conductors 12 and 13 continues to exceed the minimum acceptable voltage level, as determined by Zener diodes 21 and 22. However, if load 17 or power source 11 should develop a short circuit or other malfunction which causes the potential between lines 12 and 13 to drop below the minimum acceptable level, the reverse biased one of Zener diodes 21 and 22 will cease to conduct, withdrawing the positive bias potential on the base electrode of switch transistor 32, causing it to cease conduction. When transistor 32 ceases to conduct, the potential at the cathode electrode of Zener diode 37 rises causing diode 37 to break down and allow a positive potential from source 34 to be placed on the base electrode of transistor 35, switching transistor 35 into conduction. When transistor 35 conducts, the potential at its collector electrode and at the cathode electrode of Zener diode 39 drops to ground potential causing Zener diode 39 to cease reverse conduction and load switching means 16 to open contacts 14 and 15. Power source 11 is thereby uncoupled from load 17 in order to protect both the load and the power source from the short circuit or other malfunction.

If the fault should be within load 17 rather than power source 11, as soon as load switching means 16 opens contacts 14 and 15, the potential across conductors 12 and 13 should return to its pre-fault level, in excess of the minimum necessary source voltage. Thus the invention will once again sense this satisfactory potential level and respond by causing an energizing potential to be applied across load switching means 16. If switching means 16 were an ordinary relay without either automatic time delay response or a manual resetting feature, the invention would immediately recouple source 11 to load 17, then uncouple it again in response to a drop in potential across conductors 12 and 13 pro- In many applications this alternate coupling and uncouple, et cetera, until the fault was repaired or otherwise removed, or until power source 11 was turned off. In many applications this alternate coupling and uncoupling would be undesirable. Therefore, although load switching means 16 is not considered to be a part of this invention, it is recommended that it incorporate some form of delay or resetting means if the particular application necessitates protecting against possible malfunctions in the load, as well as the power source. Such means may be comprised of a relay requiring manual resetting prior to each electrical actuation, or a time delay relay requiring an adjustable delay time after being energized before its contacts are actuated. Switch means such as these will allow the fault to be corrected, or power source 11 to be turned off, before the load is again coupled to the power source.

Thus it may be seen, in view of the foregoing explanation and figure of drawing, that the invention, a solid state dual polarity voltage discriminating circuit to automatically detect the presence or absence of direct current voltage levels in excess of a predetermined magnitude of either polarity for controlling suitable load switching means, is a useful and necessary device.

While many modifications and changes may be made by replacing elements and components with equivalent structures, or by changing component values for particular applications, it is to be understood that I desire to be limited in the spirit of my invention only by the scope of the appended claim.

The invention described herein may be manufactured and used by or for the Government of the United States of America for governmental purposes without the payment of any royalties thereon or therefor.

I claim:

1. A solid state dual polarity voltage discriminating control circuit for detecting direct current voltage levels in a load potential circuit to be monitored in excess of a predetermined magnitude comprising:

a pair of series coupled oppositely polarized Zener diodes each having a breakdown voltage equal to a predetermined magnitude of voltage in either polarity of a potential to be monitored;

a four terminal diode bridge for converting said potential to be monitored, in excess of said predetermined magnitude regardless of relative polarity, to a single polarity control potential, said diode bridge being coupled in series combination with said pair of Zener diodes, and said series having terminal means for coupling across said potential to be monitored;

a first transistor switch means having base, emitter, and collector electrodes, said base electrode being coupled to one terminal and said emitter electrode being coupled to the opposite terminal of said four terminal diode bridge, said base electrode and said emitter electrode comprising said input means for receiving said single polarity control potential from said four terminal diode bridge;

a source of positive direct current potential;

a first resistance means having one terminal coupled to said source of positive direct current potential and the other terminal coupled to said collector electrode of said first transistor switch means;

a fourth Zener diode means having its cathode electrode coupled to said other terminal of said first resistance means;

a second resistance means having one terminal coupled to the anode electrode of said third Zener diode means and the other terminal coupled to ground potential;

a second transistor switch means having base, emitter, and collector electrodes, said base electrode being coupled to said anode electrode of said third Zener diode means, and said emitter electrode being coupled to ground potential;

a third resistance means having one terminal coupled to said source of positive direct current potential, and the other terminal coupled to said collector electrode of said second transistor switch means;

a fourth Zener diode means having its cathode electrode coupled to said other terminal of said third resistance means; and a fourth resistance means having one terminal coupled to the anode electrode of said fourth Zener diode, and the other terminal coupled to ground potential, said anode electrode of said fourth Zener diode means and said other terminal of said fourth resistance means comprising an output means for coupling to a load switching means in said load potential circuit thereby providing an energizing potential to said load switching means in response to said single polarity control potential whenever said potential to be monitored exceeds said predetermined magnitude regardless of relative polarity.

References Cited

UNITED STATES PATENTS 2,948,843   8/1960   Klein _____ 317—31 XR

DONALD D. FORRER, Primary Examiner

J. ZAZWORSKY, Assistant Examiner

U.S. Cl. X.R.

307—202, 318; 317—31, 123

PO-1050
(5/69)

UNITED STATES PATENT OFFICE
CERTIFICATE OF CORRECTION

Patent No. 3,537,757　　　　　　Dated November 3, 1970

Inventor(s) H. A. GRIFFIN

It is certified that error appears in the above-identified patent and that said Letters Patent are hereby corrected as shown below:

It is certified that errors appear in the above-identified patent and that said Letters Patent are hereby corrected as shown below:

Column 4, line 71, after "pro" and before "In" insert-- duced by the fault in load 17, then recouple, then uncouple, et cetera, until the fault was repaired or otherwise removed, or until power source 11 was turned off. --

Column 4, line 72, after "un" delete "couple, et cetera, until the fault was repaired or otherwise removed, or until power source 11 was turned off.

Column 6, Claim 1, line 9, the word "fourth" appears instead of "third"

Signed and sealed this 3rd day of August 1971.

(SEAL)
Attest:

EDWARD M. FLETCHER, JR.　　　　　WILLIAM E. SCHUYLER, JR.
Attesting Officer　　　　　　　　Commissioner of Patents